(12) United States Patent
Manoharan et al.

(10) Patent No.: US 11,283,698 B2
(45) Date of Patent: Mar. 22, 2022

(54) OPTIMIZING TIMEOUT SETTINGS FOR NODES IN A WORKFLOW

(71) Applicant: PayPal, Inc., San Jose, CA (US)

(72) Inventors: Srinivasan Manoharan, San Jose, CA (US); Joydeep Hazra, Bengaluru (IN); Shivam Pandey, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/014,825

(22) Filed: Sep. 8, 2020

(65) Prior Publication Data

US 2021/0234780 A1    Jul. 29, 2021

Related U.S. Application Data

(63) Continuation of application No. 15/854,218, filed on Dec. 26, 2017, now Pat. No. 10,771,365.

(51) Int. Cl.
*H04L 12/26* (2006.01)
*H04L 43/0852* (2022.01)
*H04L 69/28* (2022.01)
*G06F 11/34* (2006.01)
*G06F 9/50* (2006.01)
*G06F 16/901* (2019.01)
*H04L 41/5006* (2022.01)
*H04L 43/16* (2022.01)

(52) U.S. Cl.
CPC ........ *H04L 43/0858* (2013.01); *G06F 9/5072* (2013.01); *G06F 11/3419* (2013.01); *G06F 16/9024* (2019.01); *H04L 41/5006* (2013.01); *H04L 43/0852* (2013.01); *H04L 43/16* (2013.01); *H04L 69/28* (2013.01)

(58) Field of Classification Search
None
See application file for complete search history.

(56) References Cited

U.S. PATENT DOCUMENTS

| | | | |
|---|---|---|---|
| 6,038,564 A * | 3/2000 | Sameshima | G06F 16/25 707/702 |
| 6,052,684 A * | 4/2000 | Du | G06F 9/52 |
| 7,027,997 B1 * | 4/2006 | Robinson | G06Q 10/06311 705/7.26 |
| 7,289,966 B2 * | 10/2007 | Ouchi | G06Q 10/06311 705/7.13 |
| 7,299,244 B2 * | 11/2007 | Hertling | G06Q 10/06 707/694 |
| 7,810,099 B2 * | 10/2010 | Dettinger | G06Q 10/0633 718/106 |

(Continued)

*Primary Examiner* — Lashonda T Jacobs
(74) *Attorney, Agent, or Firm* — Haynes and Boone, LLP

(57) ABSTRACT

A unidirectional workflow execution engine is accessed. The unidirectional workflow includes at least a first node and a second node, where the first node is executed before the second node. A timeout setting of the first node is retrieved. An actual execution time of the first node is determined. A difference between the retrieved timeout setting and the actual execution time of the first node is calculated. A timeout setting of the second node is retrieved. The timeout setting of the second node is modified by adding, to the retrieved timeout setting of the second node, the calculated difference between the retrieved timeout setting and the execution time of the first node.

20 Claims, 8 Drawing Sheets

(56) References Cited

U.S. PATENT DOCUMENTS

| | | | | |
|---|---|---|---|---|
| 7,921,208 B2* | 4/2011 | Hochwarth | | H04L 67/142 709/225 |
| 8,260,816 B1* | 9/2012 | Vaghani | | G06F 17/00 707/791 |
| 8,762,154 B1* | 6/2014 | Witt-ehsani | | H04M 3/2218 704/270.1 |
| 10,038,619 B2* | 7/2018 | Mercuri | | H04L 43/18 |
| 10,091,297 B1* | 10/2018 | Zhao | | H04L 67/1097 |
| 2004/0249921 A1* | 12/2004 | Yamamoto | | H04L 67/02 709/223 |
| 2005/0272452 A1* | 12/2005 | Khoury | | H04L 29/08 455/466 |
| 2006/0070036 A1* | 3/2006 | Cox | | G06F 9/451 717/124 |
| 2007/0094651 A1* | 4/2007 | Stephens | | G06F 9/5083 717/151 |
| 2008/0276242 A1* | 11/2008 | Taniguchi | | G06F 9/5038 718/103 |
| 2009/0187905 A1* | 7/2009 | Sijelmassi | | G06F 9/5038 718/100 |
| 2012/0023501 A1* | 1/2012 | Chi | | G06Q 50/10 718/103 |
| 2013/0030859 A1* | 1/2013 | Jung | | G06Q 10/06 705/7.26 |
| 2013/0290974 A1* | 10/2013 | Druyan | | G06F 9/5038 718/103 |
| 2014/0068049 A1* | 3/2014 | Vigneras | | H04L 41/00 709/223 |
| 2015/0106153 A1* | 4/2015 | Kibbar | | G06Q 10/06316 705/7.26 |
| 2015/0356485 A1* | 12/2015 | Aggour | | G06Q 10/06316 705/7.26 |
| 2017/0286178 A1* | 10/2017 | Chougule | | G06F 9/50 |
| 2019/0199612 A1 | 6/2019 | Manoharan et al. | | |

\* cited by examiner

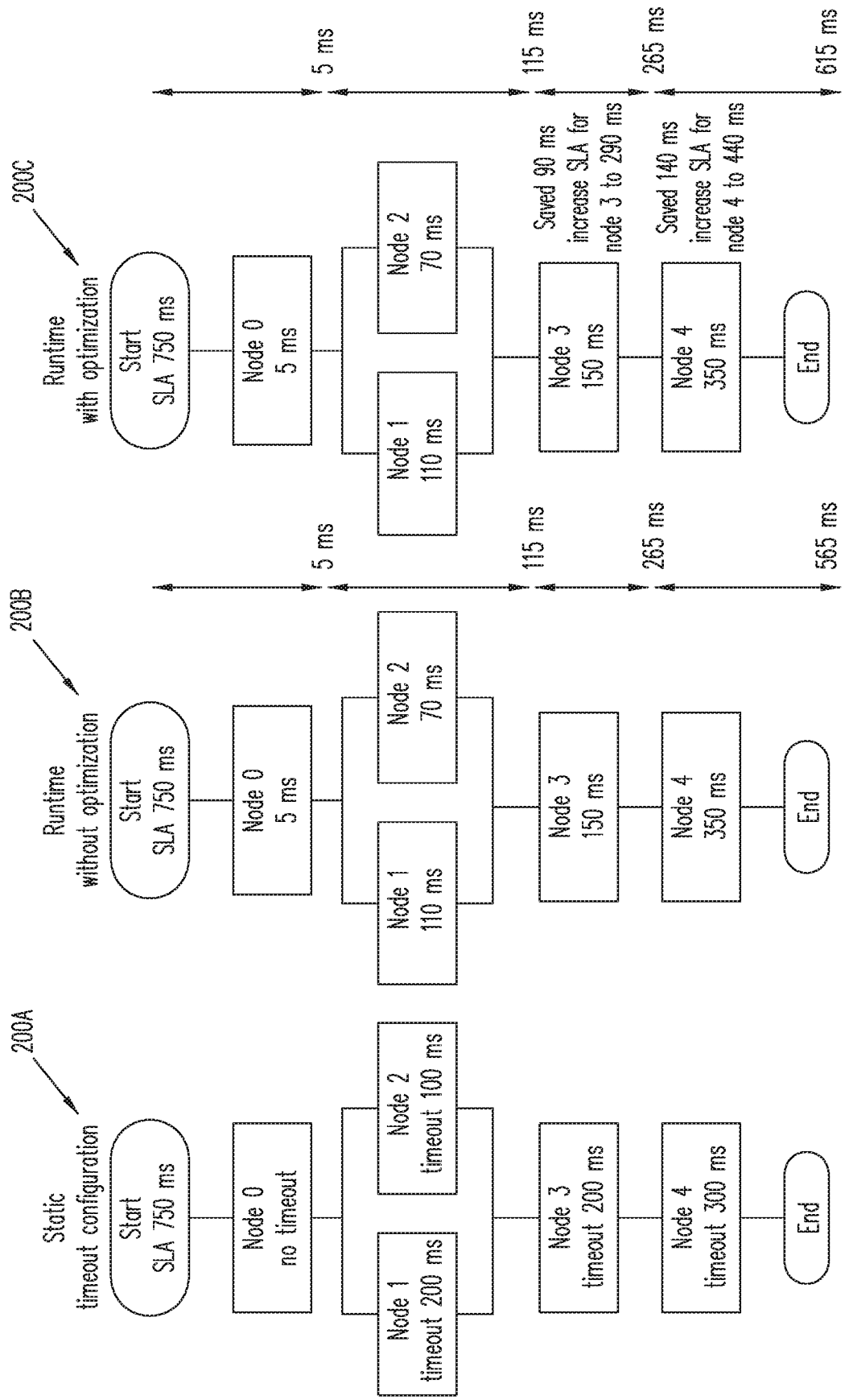

OPTIMIZING TIMEOUT SETTINGS FOR NODES IN A WORKFLOW

PRIORITY DATA

The present application is a continuation of U.S. patent application Ser. No. 15/854,218, now U.S. Pat. No. 10,771,365, filed Dec. 26, 2017, the disclosure of which is hereby incorporated in its entirety.

BACKGROUND

Field of the Invention

The present invention generally relates to optimizing timeout settings for nodes in a service-oriented architecture.

Related Art

Over the past several decades, rapid advances in Integrated Circuit fabrication and wired/wireless telecommunications technologies have brought about the arrival of the information age, in which electronic communications or interactions between people are becoming increasingly more common. Systems using service-oriented architecture (SOA) can be used to facilitate electronic communications. Workflows that comprise a plurality of nodes may be defined for any given SOA. To ensure proper execution of the workflow, timeout settings may be defined for the nodes. However, conventional timeout settings for the nodes are rigid and may not account for the different circumstances that may arise in each execution context of the workflow, which could cause the workflow to fail needlessly. To ensure a smoother execution of the workflow, it would be advantageous to optimize the timeout settings for the nodes dynamically at run time of the workflow.

BRIEF DESCRIPTION OF THE FIGURES

FIGS. 2A-2C illustrate example workflows according to various aspects of the present disclosure.

Figure 1:
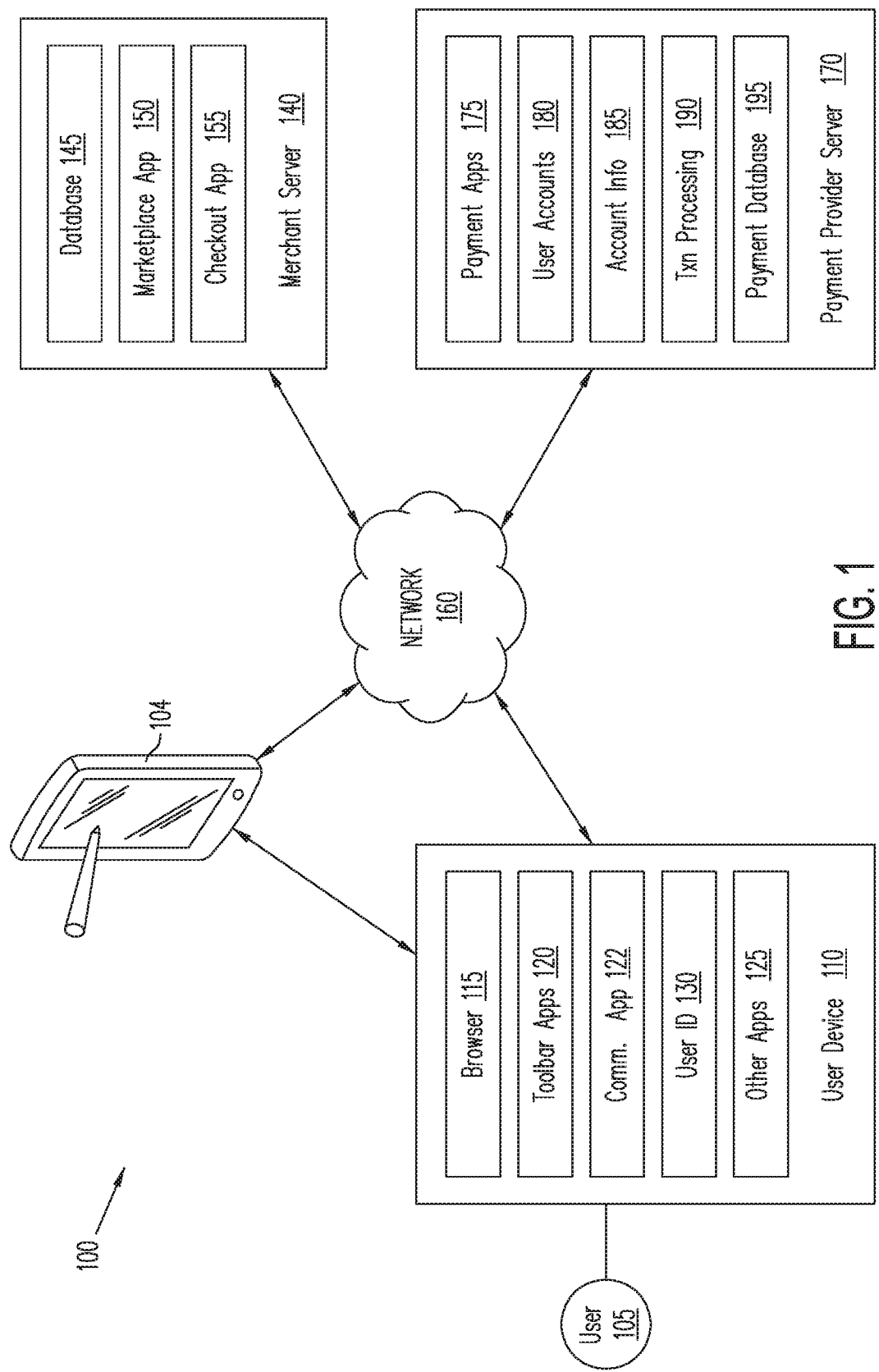
FIG. 1 is a block diagram of a networked system according to a various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Service-oriented architecture (SOA) has gained popularity recently. In a service-oriented architecture, electronic services are provided to various entities or components over a network via a suitable electronic communication protocol. The electronic services are discrete units of functionality that can be accessed remotely and maintained/updated independently. Modern day SOA systems may use a plurality of different services, which may work in conjunction to provide the functionality of the SOA system. For example, an SOA system may include many discrete Application Programming Interface (API) applications, each with a clearly defined area of responsibility. To ensure that these API applications collaborate properly, a workflow may be defined. The workflow may be executed by a workflow execution engine that includes a plurality of nodes, where each node executes a service (e.g., a different API application). The execution of the nodes may also be unidirectional or performed in a serialized manner. Each node may also have its own timeout setting. According to the present disclosure, the timeout settings of the nodes are optimized to avoid unnecessary failures of the overall workflow and to ensure a smoother execution of the workflow.

In one embodiment, a unidirectional workflow execution engine is accessed. The unidirectional workflow includes at least a first node and a second node, where the first node is executed before the second node. A timeout setting of the first node is retrieved. An actual execution time of the first node is determined. A difference between the retrieved timeout setting and the actual execution time of the first node is calculated. A timeout setting of the second node is retrieved. The timeout setting of the second node is modified by adding, to the retrieved timeout setting of the second node, the calculated difference between the retrieved timeout setting and the execution time of the first node.

FIG. 1 is a block diagram of a networked system 100 according to embodiments of the present disclosure. Networked system 100 may comprise or implement a plurality of servers and/or software components that operate to perform various transactions or processes, such as transactions or processes involving multiple parties, for example a payment transaction. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include one or more user devices such as the user devices 104 and 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, user device 110 may download a mobile application from payment provider server 170, from merchant server 140, or from another third party. The mobile application may allow user 105 to engage in transactions with other users, for example with a user of the device 104.

User devices 104/110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

The user devices 104 and 110 may have different hardware and or software from one another in some embodiments, or the same (or substantially similar) hardware and software in other embodiments. For the sake of simplicity, the user device 110 is discussed below in more detail as a representative example of the user devices of the system 100. User device 110 may be implemented using any appropriate hardware and software configured for wired and/or wireless communication over network 160. For example, in one embodiment, user device 110 may be implemented as a personal computer (PC), a smart phone, laptop computer, a wearable computing device, and/or other types of computing devices capable of transmitting and/or receiving data, such as an iPad™ from Apple™.

User device 110 may include a wireless transceiver, such as a Bluetooth transceiver or an NFC transceiver, or a radio frequency (RF) transceiver, to facilitate the electronic communication conducted with external devices. For example, user device 110 may communicate with other mobile devices, such as with the device 104, via Bluetooth Low Energy (BLE) communication or via NFC.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes service providers as well as banks and retailers. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

It is understood that the electronic interactions among the various components (e.g., the user devices 104/110, the merchant server 140, or the payment provider server 170) of the system 100 may be performed using a service oriented architecture (SOA) where a plurality of different workflows are implemented. A workflow may refer to a set of computable tasks that can be executed by a computer system, such as by the various components of the system 100. The tasks—represented by nodes within a workflow—are dependent upon each other. For example, the execution of the nodes may be performed in a serialized or unidirectional manner, where a first node has to be executed before a second node (that follows the first node) can be executed. As such, within a workflow, data flows through each of the nodes, and the input to one node is the output of its parent nodes.

In some embodiments, the workflows may each be in a form of a Directed Acyclic Graph (DAG) data structure. A DAG structure has vertices or edges, where each edge is directed from one vertex to another. Starting from any given vertex, there is no sequence of edges that can eventually loop back to the vertex. As such, the DAG structure is unidirectional. A workflow engine, which may be implemented as a computer application, is configured to execute a workflow that is specified in the form of a DAG according to embodiments of the present disclosure.

FIGS. 2A, 2B, 2C illustrates different workflows 200A, 200B, and 200C, respectively. In more detail, the workflow 200A illustrates a static timeout configuration of its nodes, the workflow 200B illustrates a runtime of its node without timeout optimization, and the workflow 200C illustrates a runtime of its nodes with optimization according to an embodiment of the present disclosure.

Referring to FIG. 2A, an overall service level agreement (SLA) timeout setting is configured, for example at 750 milliseconds (ms). It is understood the number 750 ms is merely a non-limiting example, and that the overall SLA may be configured to be any number in various embodiments. A SLA may refer to a contract or agreement between a service provider and a client, for example in a shared infrastructure environment (e.g., cloud computing). The SLA may specify many aspects of the service being provided, such as quality, availability, responsibility, etc. In the simplified example herein, the SLA specifies the timeout setting of the nodes of the workflow 200A.

The workflow 200A includes a node 0, a node 1, a node 2, a node 3, and a node 4 in this simplified example. The nodes can be classified based on the type of task they execute. In a simplified example, some of the nodes execute compute tasks and are thus classified as compute nodes, while some of the other nodes execute input/output (IO) tasks and are thus classified as IO nodes. Typically, IO tasks take significantly longer (e.g., multiple times longer) to execute than compute tasks. As a result, compute nodes may not have a timeout setting specified (since they are fast to execute), while IO nodes may have a timeout setting specified. In some embodiments, compute nodes are processes that involve CPU-intensive tasks (e.g. a very complex calculation, transforming a very complex object to another, running logic in big loops etc.) whereas IO nodes are processes involving an input/output activity (e.g., a remote procedure call, reading a file, reading data from a database, reading a status of a sensor, etc.).

One reason for having individual node level timeout settings, in addition to an overall SLA workflow timeout setting, is that the individual node level timeout settings allow a problematic node to be identified, and then the problem can be addressed. If any given node is taking too long to execute (e.g., does not complete prior to a timeout or other time period, one solution is to implement a fall back node, for example a node that runs in parallel to the problematic node. Thus, rather than failing an entire workflow when that given node takes too long to execute, the overall workflow may still be executed while using the fall back node as an alternative solution.

In the example in FIG. 2, node 0 is a compute node and does not have a specifically configured timeout setting. In other words, it has no timeouts. Nodes 1-4 are IO nodes and do have their own timeout settings. For example, node 1 has a configured timeout setting of 200 ms, node 2 has a configured timeout setting of 100 ms, node 3 has a configured timeout setting of 200 ms, and node 4 has a configured timeout setting of 300 ms. As the workflow 200A is in the DAG structure, the execution of the nodes herein is unidirectional (or serialized), in that node 0 is executed first, followed by node 1 and node 2 (which are executed in parallel to each other), and them by node 3, and node 4. For the workflow 200A to be properly executed, each node (except node 0) has to be executed within its specified timeout setting, and the overall runtime for all the nodes combined (node 0+the longer one of (node 1 or node 2)+node 3+node 4) has to be within the SLA timeout setting of 750 ms specified for the overall SLA.

The workflow 200B in FIG. 2B illustrates an example scenario in which the workflow 200A is executed. In this example, the actual runtimes for node 0 through node 4 are 5 ms, 110 ms, 70 ms, 150 ms, and 350 ms, respectively. Thus, the cumulative runtime after the execution of node 0 is 5 ms, the cumulative run after the execution of parallel nodes 1 and 2 is 115 ms (5 ms+110 ms (because this is the longer of the nodes 1 and 2)=115 ms), the cumulative run after the execution of node 3 is 265 ms (115 ms+150 ms=265 ms). The overall runtime would have been: 5 ms+110 ms+150 ms+350 ms=615 ms, which is smaller than the specified overall SLA runtime of 750 ms for the workflow. However, since the runtime for node 4 (350 ms) exceeds the configured runtime of 300 ms for that node, the workflow would fail after the node 4 has been running for 300 ms. In other words, at a runtime of 565 ms (265 ms+300 ms=565 ms), the workflow would send back an error indicating that node 4 took more time than the configured 300 ms to execute, and thus it has been timed out. Thus, it can be seen that without runtime optimization, the workflow (such as the workflow 200B) may still fail even if the overall runtime meets the configured SLA timeout requirement.

FIG. 2C illustrates a workflow 200C that optimizes the runtime according to an embodiment of the present disclosure. In the workflow 200C, the timeout settings of each individual node is manipulated dynamically at runtime, such that the amount of "time saved" during the execution of any given node can be passed on to a subsequent node (also referred to as a child node), if a subsequent node is available, while keeping the configured overall SLA intact. In more detail, the actual execution time of 5 ms for node 0 is irrelevant here, since node 0 does not have a specified timeout setting (see FIG. 2A). In other words, the lack of a timeout setting for node 0 means that there is no "time saved" or "time wasted" via the execution of node 0.

Node 0 is a parent node of node 1 and node 2, which are parallel nodes. The actual execution time for node 1 is 110 ms, and the actual execution time for node 2 is 70 ms. Compared to the specified timeout setting of 200 ms for node 1, the amount of "time saved" associated with the execution of node 1 is 200 ms−110 ms=90 ms. Similarly, compared to the specified timeout setting of 100 ms for node 2, the amount of "time saved" associated with the execution of node 2 is 100 ms−70 ms=30 ms. Since more time is saved during the execution of node 1 compared to node 2 (90 ms vs 30 ms), 90 ms is used as the "time saved" during the execution stage of nodes 1 and 2. The 90 ms of saved time is passed on to the next stage of the workflow, which is node 3. Whereas node 3 initially has a configured timeout setting of 200 ms, its timeout setting is dynamically increased at runtime by the 90 ms that is passed on from its ancestor nodes 1 or 2. Thus, node 3 now has a newly configured timeout setting of 200+90=290 ms. This means that as long as node 3 takes no more than 290 ms to execute, node 3 will not time out.

Still referring to FIG. 2C, the actual execution time of node 3 took 150 ms. Compared to the newly configured timeout setting of 290 ms, the execution of node 3 saves 290−150=140 ms. The 140 ms of saved time is again passed on to the next stage, which is node 4.

Whereas node 4 initially has a configured timeout setting of 300 ms, its timeout setting is dynamically increased at runtime by the 140 ms that is passed on from its ancestor node 3. Thus, node 4 now has a newly configured timeout setting of 300+140=440 ms. This means that as long as node 4 takes no more than 440 ms to execute, node 4 will not time out. Since the actual execution time for node 4 is 350 ms, which is less than the specified timeout setting of 440 ms, node 4 will not time out. Again, the amount of "time saved" accumulated from the ancestor nodes of node 4 is passed on to the timeout setting for node 4, thereby allowing it to execute for a longer period of time without timing out, and this process reduces unnecessary errors from being generated. The overall execution time of the workflow 200C is 5 ms (node 0)+110 ms (node 1)+150 ms (node 3)+350 ms (node 4)=615 ms, which is also within the specified overall SLA timeout setting of 750 ms. Hence, the workflow 200C will not fail or report back an error.

In some embodiments, the workflows 200A-200C may be represented by (or written in the form of) a DOT programming language (a plain text graph description language), for example as follows:

```
digraph G {
    Start ->node0;
    node0 -> node1;
    node0 -> node2;
    node1-> node3;
    node2 -> node3;
    node3 -> node4;
    node4 -> End;
    Start [shape=Square];
    node1[timeout = "200 ms"];
    node2[timeout = "100 ms"]
    node3[timeout = "200 ms"]
    node4[timeout = "300 ms"]
    End [shape=Square];
}
```

The tasks for each of the nodes may be provided to the workflow execution engine as another mapping configuration with the node names to the actual executable electronic files. Below is an example of using a Yaml syntax to configure the tasks (processors written in the Java language):
processors:
    name: node0
      clazz:
        com.paypal.sample.convert.ri.compute.Node0Processor
    name: node1
      clazz:
        com.paypal.sample.convert.ri.io.Node1Processor
    name: node2
      clazz:
        com.paypal.sample.convert.ri.io.Node2Processor
    name: node3
      clazz:
        com.paypal.sample.convert.ri.io.Node3Processor
    name: node4
      clazz:
        com.paypal.sample.convert.ri.io.Node4Processor In some embodiments, instead of providing fixed static timeout settings, the timeout settings for the overall SLA workflow and/or for the individual nodes may be dynamically configured at a runtime of the workflow. This supports the client-provided timeout values. For example, for the same workflow, different clients may specify different timeout requirements. Clients can send the required timeout settings as a part of the input data for the workflow. In some embodiments, the client-provided timeout settings may be configured using an application hook. In more detail, an application hook is a way to provide logic to calculate the timeout at runtime. This is useful when the timeout value of a node (or the overall SLA of the workflow) is not known in advance, and it needs to be calculated at runtime. The code details for an example application hook called Timeout Provider are provided below in the Java programming language:

```
The interface TimeOutProvider
public interface TimeoutProvider {
    public final static Integer DEFAULT_SERVICE_SLA = 2000;
    public final static Integer DEFAULT_COMPUTE_SLA = 15;
    /**
     * This method inspects the input object and returns timeout value in
        milliseconds
     * @param input Object
     * @return timeout value in milliseconds
     */
    public int getTimeout(Object input);
}
```

In the above example, the application hook, when invoked, returns different timeout values based on the product identifier in the input object. For example, it returns a default timeout value of 2000 ms for IO nodes, and a default value of 15 ms for compute nodes. The Java code details for another example application hook is listed below:

```
public class TimeoutProviderImpl implements TimeoutProvider {
    @Override
    public int getTimeout(Object input) {
        if (input instanceof PaymentReviewDecisionRequest) {
                        PaymentReviewDecisionRequest request =
(PaymentReviewDecisionRequest) input;
            if (request != null && request.getTransactionContext( ) != null
                && request.getTransactionContext( ).getProductIdentifiers( ) != null) {
                        ProductIdentifiers productIdentifier =
request.getTransactionContext( ).getProductIdentifiers( );
                if (productIdentifier.getLegacyProductFamily( ) != null)
                    return 23000;
                if (productIdentifier.getPaymentsAcceptanceSolution( ) != null)
                    return 24000;
            }
        }
        return DEFAULT_SERVICE_SLA;
    }
}
```

In the example above, the implementation class is configured using the timeoutProvider attribute. The workflow execution engine invokes the getTimeout method on every execution to find out the timeout value. As an example, a node 1 that does not have a static timeout value may dynamically configure a timeout value using an application hook timeoutProvider as follows:

node1[timeoutProvider=
      com.paypal.sample.timeout.SampleTimeoutProvider].

Figures 3A, 3B:
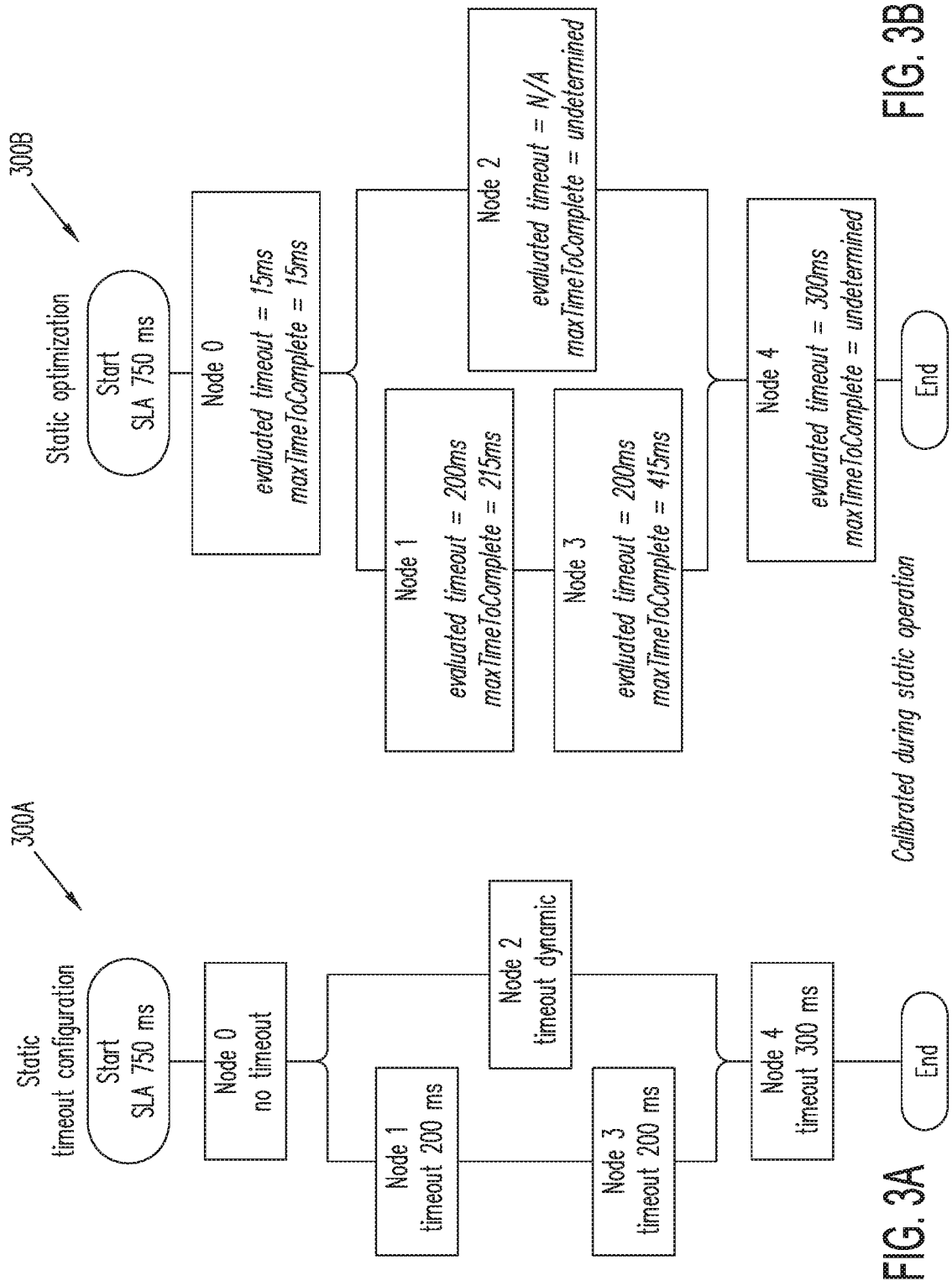
FIGS. 3A-3C illustrate example workflows according to various aspects of the present disclosure.
Figure 3C:
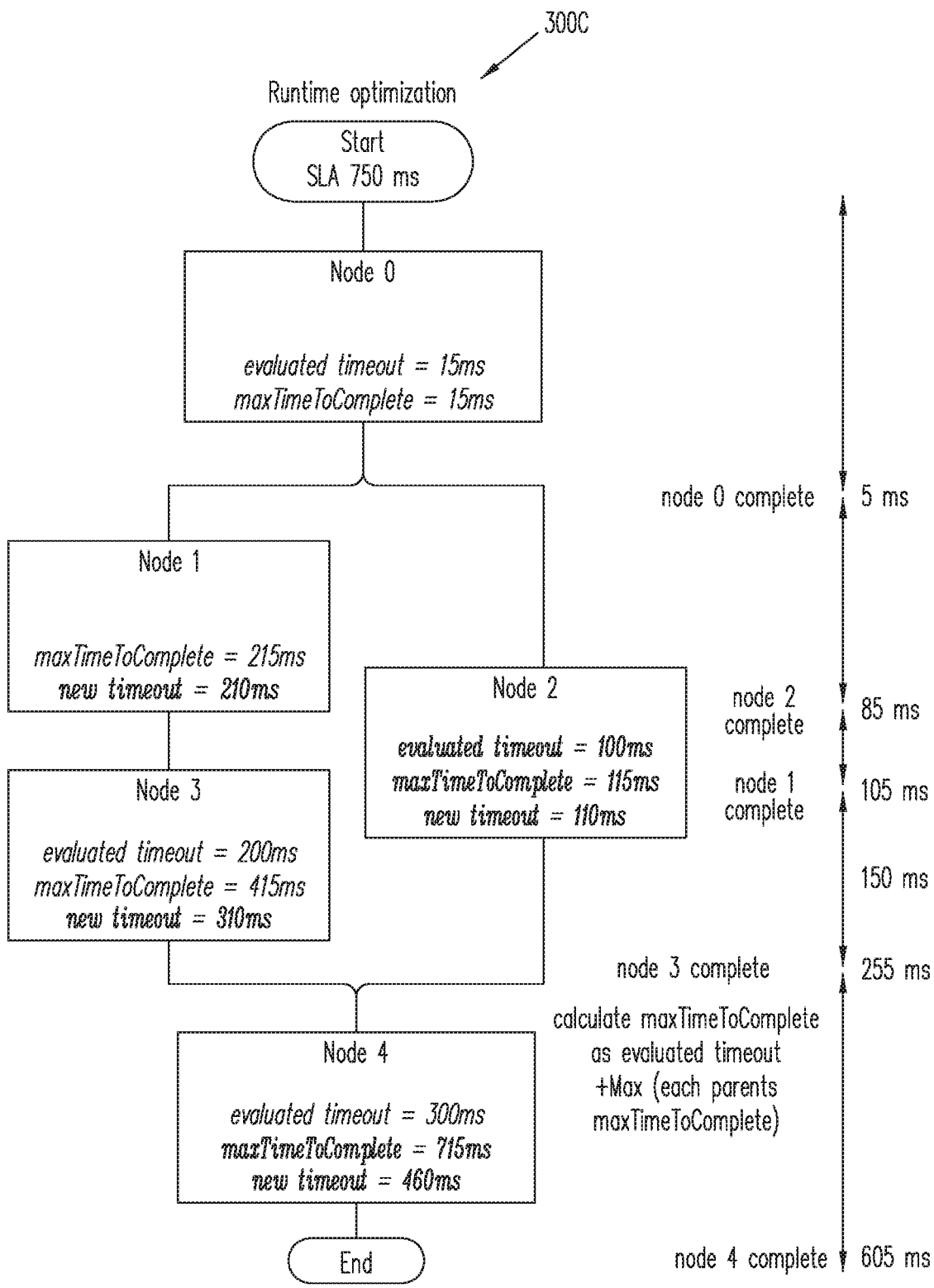

FIGS. 3A, 3B, and 3C illustrate additional examples of workflows in which the timeout settings can be optimized according to embodiments of the present disclosure. FIG. 3A illustrates a workflow 300A with a static timeout configuration, FIG. 3B illustrates a workflow 300B with a static optimization, and FIG. 3C illustrates a workflow 300C with a runtime optimization. In the embodiment shown in FIGS. 3A-3C, the optimization process is broken down into two phases: static optimization is the first phase, and runtime optimization is the second phase. The static optimization occurs during initialization of the workflow and is a one-time activity, whereas the runtime optimization occurs dynamically at every execution of the workflow and uses the pre-calculated values from the static optimization phase. Breaking the optimization down to two phases helps reduce the overhead of performing the various calculations discussed below for every node, and therefore improves the runtime performance of the execution. However, it is understood that the two-phase approach is not required and is not intended to limit the scope of the present disclosure. In some embodiments, the static optimization phase and the runtime optimization phase may be merged or combined into a single phase.

In more detail, according to the static configuration of the workflow 300A in FIG. 3A, the overall SLA timeout setting is specified to be 750 ms in this example. Node 0 is a compute node and has no specified timeout settings, node 1 is an IO node and has a statically configured timeout setting of 200 ms, node 2 is an IO node and has a dynamically configured timeout setting, node 3 is an IO node and has a statically configured timeout setting of 200 ms, and node 4 is an IO node and has a statically configured timeout setting of 300 ms.

The workflow 300B in FIG. 3B is based on the workflow 300A but with static optimization implemented (e.g., the first phase of the optimization of the present disclosure). Again, the workflow 300B is not executed yet at this point. The overall SLA timeout setting is specified to be 750 ms. For node 0, the timeout setting is not configured, so a default value may be used, for example 15 ms in this case. The default value of the timeout setting is expressed as "evaluated timeout." However, the "evaluated timeout" is not always limited to the default value. For some nodes, the "evaluated timeout" may be provided by the application hook discussed above. For example, during static optimization, a node is assigned the default timeout value if it does not have any timeout settings configured. During runtime optimization (e.g., discussed below in more detail with reference to FIG. 3C), the workflow engine that executes the workflow invokes the application hook (e.g., the Timeout Provider discussed above) and updates the timeout setting for the nodes accordingly.

Another term is "maxTimeToComplete", and this term represents the maximum amount of time that a workflow can wait for completion of a node from the start of the workflow execution (e.g., starting at node 0). As such, "maxTimeToComplete" for any given node is dependent on the "MaxTimeToComplete" of its parent nodes, which are also dependent on their respective parent nodes, so on and so forth. The "maxTimeToComplete" for any given node i is expressed as the following mathematical equation:

$$MaxTimeToComplete_{node}^i = EvaluatedTimeoute_{node}^i + Max(MaxTimeToComplete_{parent}),$$

where $Max(MaxTimeToComplete_{parent})$ is the greatest value of the MaxTimeToComplete if there are multiple parent nodes for node i.

For node 0, it has no parent nodes, and thus the Max $(MaxTimeToComplete_{parent})$ is 0 ms. Hence, the MaxTimeToComplete for node 0="evaluated timeout" for node 0+0 ms=15 ms, since the "MaxTimeToComplete" for node 0 is 15 ms.

For node 1, its timeout setting was configured to be 200 ms according to the static timeout configuration (as shown in FIG. 3A). Thus, the "evaluated timeout" for node 1 is 200 ms. There is one parent node for node 1, which is node 0. Since the "MaxTimeToComplete" for node 0 is 15 ms, the "MaxTimeToComplete" for node 1=200 ms+15 ms=215 ms.

For node 2, its timeout setting is dynamically configured by the application hook (e.g., by timeoutProvider). At this point, the timeout setting for node 2 cannot be determined, as the workflow is not executed yet, and there is no input object for the workflow. Accordingly, the "evaluated timeout" for node 2 is N/A (not applicable), which means it is undetermined. Node 2 also has one parent node, which is node 0. As discussed above, the "MaxTimeToComplete" for node 0 is 15 ms. However, since the "evaluated timeout" for node 2 is unknown, the "MaxTimeToComplete" for node 2 still cannot be calculated at this step, and thus the "MaxTimeToComplete" for node 2 is shown as being undetermined in FIG. 3B.

For node 3, its timeout setting was configured to be 200 ms according to the static timeout configuration (as shown in FIG. 3A). Thus, the "evaluated timeout" for node 3 is 200 ms. There is one parent node for node 3, which is node 1. Since the "MaxTimeToComplete" for node 1 is 215 ms, the "MaxTimeToComplete" for node 3=200 ms+215 ms=415 ms.

For node 4, its timeout setting was configured to be 300 ms according to the static timeout configuration. Thus, the "evaluated timeout" for node 4 is 300 ms. There are two parent nodes for node 4, and they are node 3 and node 2. The longer one of the "MaxTimeToComplete" for node 3 and node 2 needs to be known before the "MaxTimeToComplete" for node 4 can be calculated. However, as discussed above, the "MaxTimeToComplete" for node 2 is still undetermined at this point. This means that the "MaxTimeToComplete" for node 4 cannot be calculated yet, and it is shown as being "undetermined" in FIG. 3B.

Referring now to FIG. 3C, the runtime optimization is the second phase of the optimization process according to embodiments of the present disclosure. At the runtime optimization phase, the workflow 300C is actually executed. For each client, the workflow 300C may be executed differently, for example it may retrieve different dynamically configured timeout values from different clients via the application hook. It is understood that runtime optimization may occur at every execution of the workflow 300C, and it may use the pre-calculated values from the static optimization phase.

For node 0, its "evaluated timeout" is 15 ms, and its "maxTimeToComplete" is 15 ms. These values are the same as the values for node 0 from the static optimization, since the runtime optimization uses the pre-calculated values from the static optimization.

For node 0, it has no parent nodes, and thus the Max (MaxTimeToComplete$_{parent}$) is 0 ms. Hence, the MaxTimeToComplete for node 0="evaluated timeout" for node 0+0 ms=15 ms, since the "MaxTimeToComplete" for node 0 is 15 ms. The actual execution of node 0 took 5 ms in this example, and the dependent nodes (node 1 and node 2) of node 0 are signaled to begin their execution upon the completion of the execution of node 0.

For node 1, its "evaluated timeout" and "maxTimeToComplete" values are also retrieved from the static optimization phase, which in this example are 200 ms and 215 ms, respectively. According to the present disclosure, an optimized timeout setting or value is calculated for node 1 (and for the rest of the nodes in the runtime optimization workflow 300C, as discussed below in more detail). The optimized timeout value is expressed as "new timeout" in FIG. 3C, and it may be mathematically defined as follows:

new timeout=maxTimeToComplete−current execution time, where the current execution time is defined as the total amount of execution time for the workflow up to the point before the current node is executed.

Using the equation above, the "new timeout" value of node 1 is calculated as 215 ms−5 ms=210 ms. Compared to the old "evaluated timeout" of 200 ms, node 1 now has a revised "new timeout" value of 210 ms, which is 10 ms longer. This is because the execution of its parent node (node 0) took 10 ms less than the allotted time: the actual execution of node 0 is 5 ms, but it was given 15 ms to execute. Thus, the execution of node 0 "saved" 10 ms of time, and this saved time is passed on to node 1, which is reflected in the revised timeout setting (i.e., "new timeout") of node 1.

After calculating the new (and optimized) timeout value for node 1, the processing in node 1 is executed, which took 100 ms in this example. Upon the completion of the execution of node 1, its dependent node 3 is signaled.

For node 2, its "evaluated timeout" is dynamically configured by calling it with the application hook at the runtime. In this example, the "evaluated timeout" for node 2 is dynamically configured to be 100 ms. There is one parent node for node 2, so its parent node's "maxTimeToComplete" is 15 ms (i.e., the "maxTimeToComplete" of node 0). The "maxTimeToComplete" of node 2 is calculated by adding its own "evaluated timeout" with the parent node's "maxTimeToComplete", which in this case is 100 ms+15 ms=115 ms. The optimized timeout setting for node 2 is calculated as "new timeout"=maxTimeToComplete for node 2−current execution time=115 ms−5 ms=110 ms. For reasons similar to those discussed above with reference to node 1, node 2 also inherits the 10 ms of time that was saved during the execution of its parent node: node 0. Accordingly, this is also is reflected in the revised timeout setting (i.e., "new timeout") of node 2, which is 10 ms longer than the previously configured "evaluated timeout" setting (e.g., 110 ms−100 ms=10 ms).

After calculating the new (and optimized) timeout value for node 2, the processing in node 2 is executed, which took 80 ms in this example. Upon the completion of the execution of node 2, its dependent node 4 is signaled.

For node 3, its "evaluated timeout" and "maxTimeToComplete" values are also retrieved from the static optimization phase, which in this example are 200 ms and 415 ms, respectively. The current execution time at this point (before node 3 is executed) is 5 ms of actual execution time for node 0 plus the 100 ms of actual execution time for node 1=105 ms. Thus, the optimized timeout setting for node 3 is calculated as "new timeout"=maxTimeToComplete for node 3−current execution time=415 ms−105 ms=310 ms. Compared to the old "evaluated timeout" of 200 ms, node 3 now has a revised "new timeout" value of 310 ms, which is 110 ms longer. This is because the execution of its parent node (node 1) took 110 ms less than the allotted time: the actual execution of node 1 is 100 ms, but it was given 210 ms to execute. Thus, the execution of node 1"saved" 110 ms of time (some of this saved time was passed on from node 1), and this 110 ms of saved time is then passed on to node 3, which is reflected in the revised timeout setting (i.e., "new timeout") of node 3.

After calculating the new (and optimized) timeout value for node 3, the processing in node 3 is executed, which took 150 ms in this example. Upon the completion of the execution of node 3, its dependent node 4 is signaled.

For node 4, its "evaluated timeout" is retrieved from the static optimization phase, which in this case is 300 ms. There are two parent nodes for node 4, which are node 3 and node 2. Among these two parent nodes, node 3 has a greater "maxTimeToComplete" (e.g., 415 ms for node 3V.S. 115 ms for node 2). As such, the "maxTimeToComplete" for node 4 is calculated using the 415 ms of "maxTimeToComplete" for node 3. In this example, the "maxTimeToComplete" for node 4=300 ms+415 ms=715 ms. The current execution time at this point (before node 4 is executed) is 5 ms of actual execution time for node 0 plus the 100 ms of actual execution time for node 1 plus the 150 ms of actual execution time for node 3=255 ms. Thus, the optimized timeout setting for node 4 is calculated as "new timeout"=maxTimeToComplete for node 4−current execution time=715 ms−255 ms=460 ms.

Compared to the old "evaluated timeout" of 300 ms, node 4 now has a revised "new timeout" value of 460 ms, which is 160 ms longer. This is because the execution of its parent node (node 3) took 160 ms less than the allotted time: the actual execution of node 3 is 150 ms, but it was given 310 ms to execute. Thus, the execution of node 3 "saved" 160 ms of time (some of this saved time was passed on from node 1 and node 0), and this 160 ms of saved time is then passed on to node 4, which is reflected in the revised timeout setting (i.e., "new timeout") of node 4. It is understood that although node 2 is also a parent node of node 4, the "time saved" in the execution of node 2 is only 30 ms (110 ms of allotted time−80 ms of actual execution time). The algorithm herein uses the longer of the time saved if there are multiple parent nodes, and thus the time saved from node 3 is used, but the time saved from node 2 is discarded from the calculations.

In an alternative embodiment, the last node in a workflow uses a special case calculation for the "new timeout" value. For example, the last node in the workflow may have the remaining available time allocated to its execution irrespective of the value of its maxTimeToComplete. In this example, the "new timeout" value of node 4 may be calculated as the total SLA timeout value (750 ms in this case)−total amount of execution time of the workflow before node 4 is executed (255 ms in this case)=495 ms. In other words, the execution of node 4 may take up to 495 ms in this alternative embodiment.

After calculating the new (and optimized) timeout value for node 4, the processing in node 4 is executed, which took 350 ms in this example. The completion of the execution of node 4 signals the end of the workflow 300C. The total amount of execution time for the workflow 300C took 255 ms+350 ms=605 ms in this simplified example.

Although FIGS. 2A-2C and FIGS. 3A-3C illustrate different workflow examples, and a plurality of new terms (e.g., "evaluated timeout", "maxTimeToComplete", "new timeout") are introduced to describe the workflows in association with FIGS. 3A-3C, it is understood that the workflows in FIGS. 2A-2C and 3A-3C effectively reflect the same underlying concept of the present disclosure, which is optimizing the timeout settings of any given node of a workflow by extending its timeout value based on how much time has been saved via the execution of its ancestor nodes (e.g., time saved in association with the execution of the parent node(s), grandparent node(s), great grandparent node(s), etc.).

It is also understood that flags that control the optimization behavior for the nodes may be implemented in some embodiments. As two simple examples, a "SlaOptimizationRequired" flag and a "ignoreSlaOptimization" flag may be used. The "SlaOptimizationRequired" flag is used to specify whether the automatic optimization is required for the whole workflow. The "ignoreSlaOptimization" flag, on the other hand, is used at a workflow node level to specify whether automatic optimization should be used for a particular node. For example, in the following code: node3[timeout=200 ms, ignoreSlaOptimization=true], the "ignoreSlaOptimization" flag is enabled or turned on. This means that for node 3, it should just use the existing configured static timeout value, rather than optimizing the timeout according to the algorithms discussed above in association with FIGS. 2A-2C and FIGS. 3A-3C. This may be because the processing for node 3 may require intensive computation and/or much of the network resources. There may also be multiple executions of the same workflow running in parallel. If the resource-consuming node such as node 3 is allowed to run for a long duration—which would have been the case if its timeout settings have been optimized—then it can potentially create resource contention problems and may eventually slow down the system too much. As such, it is beneficial to provide a switch to turn off the optimization at every node level, for example via the "ignoreSlaOptimization" flag.

Figure 4:
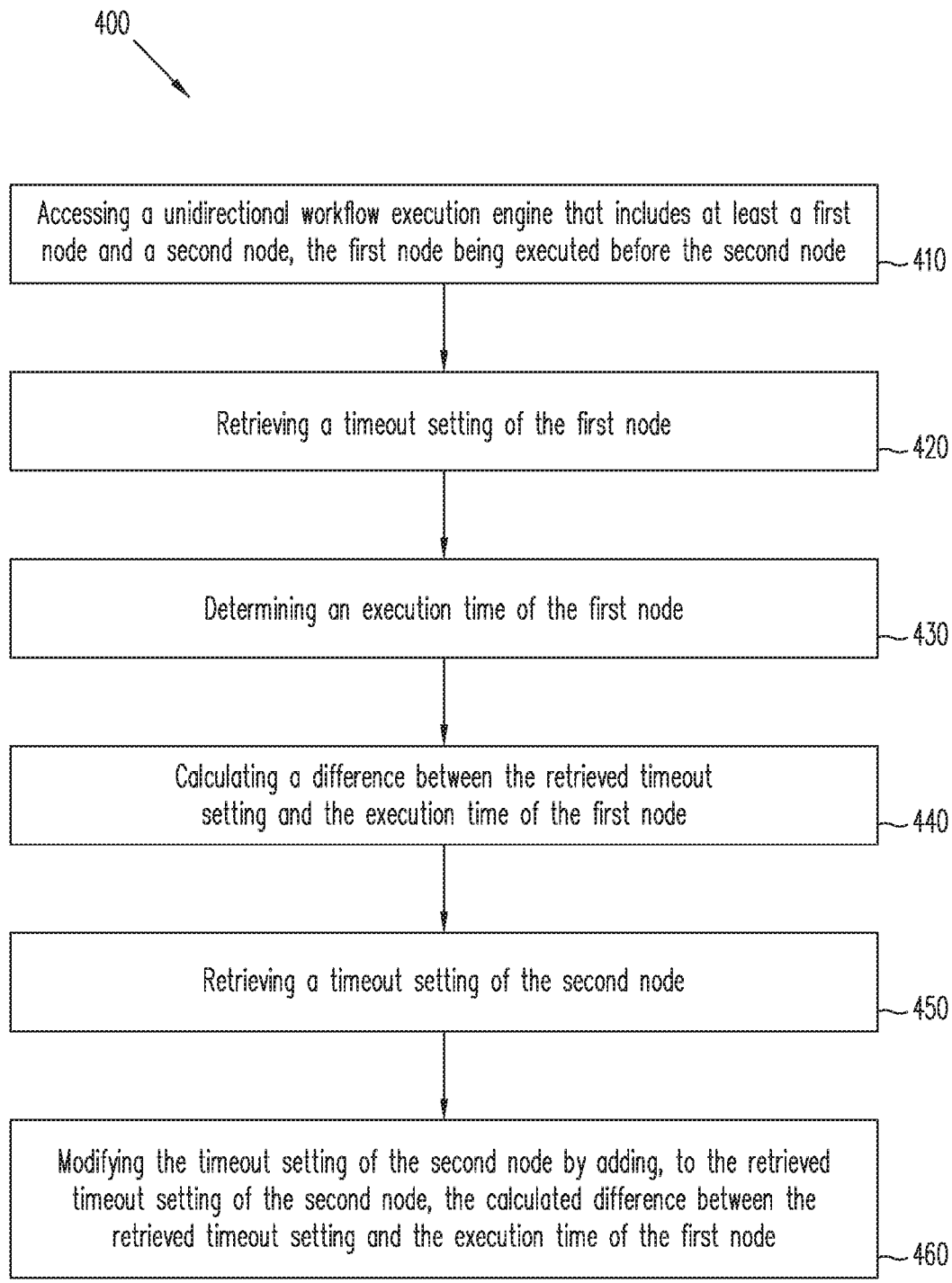
FIG. 4 is a flowchart illustrating a method of optimizing timeout settings of nodes in a workflow according to various aspects of the present disclosure.

FIG. 4 is a flowchart illustrating a method 400 for optimizing a timeout setting for one or more nodes in a workflow. The method 400 includes a step 410 of accessing a unidirectional workflow execution engine that includes at least a first node and a second node, the first node being executed before the second node. In some embodiments, the unidirectional workflow engine includes a plurality of nodes that include the first node and the second node. A first subset of the plurality of nodes are compute nodes, a second subset of the plurality of nodes are input/output (IO) nodes, and the first node and the second node are IO nodes. The IO nodes take a longer time to execute than the compute nodes. At least some of the nodes of the plurality of nodes are executed in parallel to one another.

The method 400 includes a step 420 of retrieving a timeout setting of the first node.

The method 400 includes a step 430 of determining an execution time of the first node.

The method 400 includes a step 440 of calculating a difference between the retrieved timeout setting and the execution time of the first node.

The method 400 includes a step 450 of retrieving a timeout setting of the second node.

The method 400 includes a step 460 of modifying the timeout setting of the second node by adding, to the retrieved timeout setting of the second node, the calculated difference between the retrieved timeout setting and the execution time of the first node.

In some embodiments, the unidirectional workflow execution engine executes a workflow that is in a form of a Directed Acyclic Graph (DAG). In some embodiments, the workflow specifies an overall service level agreement (SLA) timeout setting. In some embodiments, the overall SLA timeout setting is provided by a client of the workflow. In some embodiments, an error is returned in response to a determination that an overall execution time of the workflow exceeds the specified overall SLA timeout setting. In some embodiments, an error is returned in response to a determination that an execution time of the second node exceeds the modified timeout setting of the second node.

In some embodiments, the timeout setting of the first node or of the second node is retrieved dynamically during an execution of the unidirectional workflow execution engine. In some embodiments, the timeout setting of the first node or of the second node is retrieved dynamically via an application hook upon an execution of the first node or the second node.

It is understood that additional method steps may be performed before, during, or after the steps 410-460 discussed above. For example, the method 400 may further include a step of determining a value of a flag associated with the second node, and a step of disabling the modifying in response to the value of the flag indicating that the modifying should not be performed.

Figure 5:
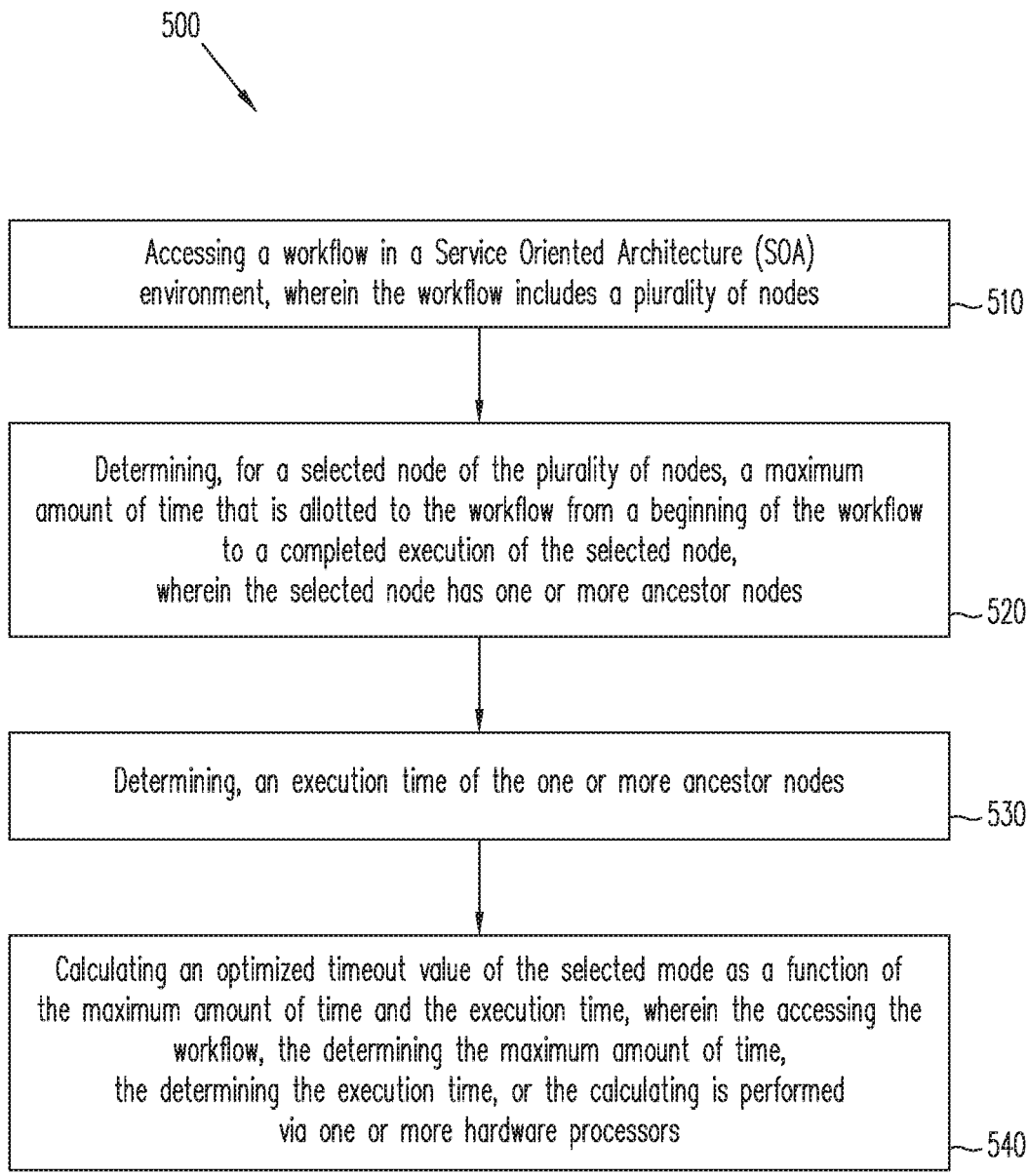
FIG. 5 is a flowchart illustrating a method of optimizing timeout settings of nodes in a workflow according to various aspects of the present disclosure.

FIG. 5 is a flowchart illustrating a method 500 for optimizing a timeout setting for one or more nodes in a workflow. The method 500 includes a step 510 of accessing a workflow in a Service Oriented Architecture (SOA) environment, wherein the workflow includes a plurality of nodes. In some embodiments, the workflow is defined as a Directed Acyclic Graph (DAG).

The method 500 includes a step 520 of determining, for a selected node of the plurality of nodes, a maximum amount of time that is allotted to the workflow from a beginning of the workflow to a completed execution of the selected node. The selected node has one or more ancestor nodes. In some embodiments, the determining the maximum amount of time comprises retrieving, at a runtime of the workflow and via an application hook, a timeout value of at least one of the one or more ancestor nodes.

The method 500 includes a step 530 of determining, an execution time of the one or more ancestor nodes.

The method 500 includes a step 540 of calculating an optimized timeout value of the selected node as a function of the maximum amount of time and the execution time. At least one of the steps 510-540 is performed via one or more hardware processors. In some embodiments, the calculating comprises subtracting the execution time from the maximum amount of time.

It is understood that additional method steps may be performed before, during, or after the steps 510-540 discussed above. For example, the method 500 may include a step of repeating the accessing the workflow, the determining the maximum amount of time, the determining the execution time, and the calculating for one or more other nodes of the plurality of nodes. As another example, the method 500 may include a step of reading a value of a flag associated with the selected node, and a step of applying a preconfigured timeout value to the selected node in response to the value of the flag indicating that the optimized timeout value should not be used for the selected node.

Figure 6:
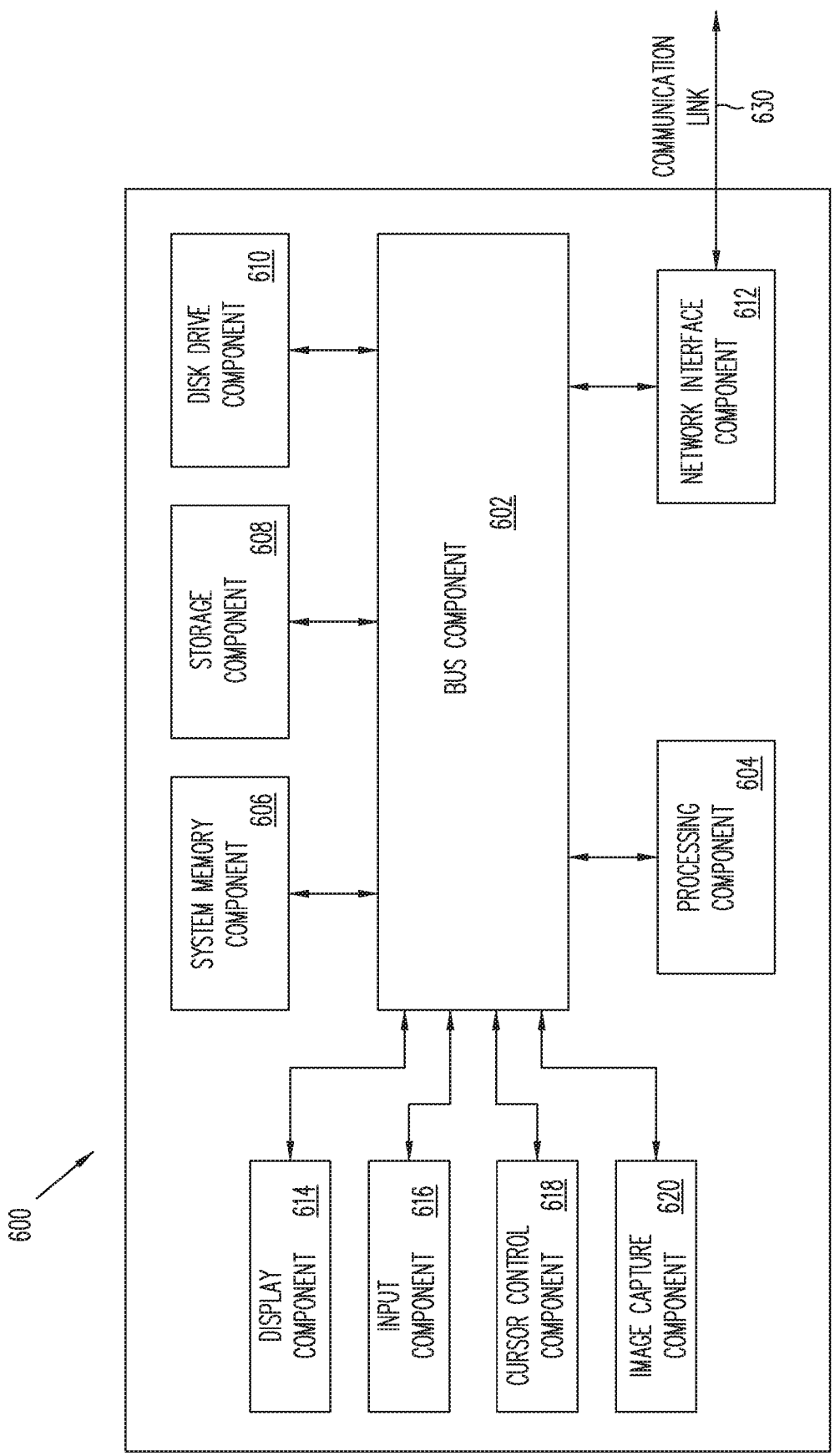
FIG. 6 is an example computer system for implementing the process flows of protecting user anonymity according to various aspects of the present disclosure.

FIG. 6 is a block diagram of a computer system 600 suitable for implementing various methods and devices described herein, for example, the workflows 200A-200C and 300A-300C and the various method steps of the methods 400 and 500. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the work flows 200A-200C and 300A-300C and the methods 400-500 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 7:
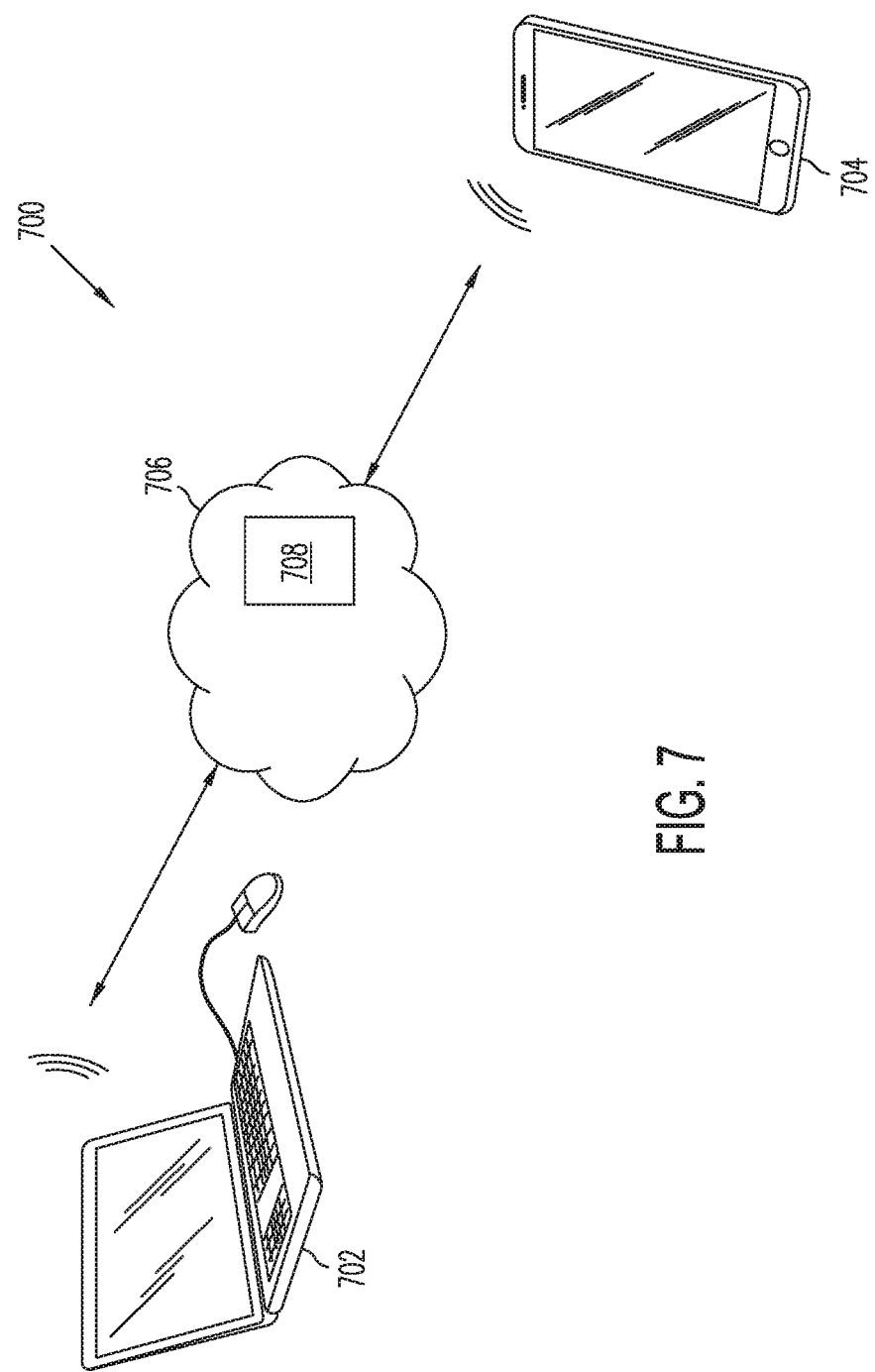
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The service oriented architecture discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is that by optimizing the node timeout settings, an execution of a node that is taking longer than expected may not needlessly fail the entire workflow. A parent node that is executing faster than expected and thus has some unutilized time can then pass on the unutilized time to the child node for their use. As such, the workflow may be run more smoothly and more efficiently. Another advantage is that the dynamic configuration of the timeout settings means that there is no need to maintain rigid configuration attributes, since the timeout values can be dynamically invoked during a runtime of the workflow. The various aspects of the present disclosure are also compatible with existing process flow and do not require extensive hardware or software modifications, and thus the present disclosure is cheap to implement.

One aspect of the present disclosure involves a system that includes a non-transitory memory and one or more hardware processors coupled to the non-transitory memory and configured to read instructions from the non-transitory memory to cause the system to perform operations comprising: accessing a unidirectional workflow execution engine that includes at least a first node and a second node, the first node being executed before the second node; retrieving a timeout setting of the first node; determining an execution time of the first node; calculating a difference between the retrieved timeout setting and the execution time of the first node; retrieving a timeout setting of the second node; and modifying the timeout setting of the second node by adding, to the retrieved timeout setting of the second node, the calculated difference between the retrieved timeout setting and the execution time of the first node.

Another aspect of the present disclosure involves a method of optimizing a workflow. The method includes: accessing a workflow in a Service Oriented Architecture (SOA) environment, wherein the workflow includes a plurality of nodes; determining, for a selected node of the plurality of nodes, a maximum amount of time that is allotted to the workflow from a beginning of the workflow to a completed execution of the selected node, wherein the selected node has one or more ancestor nodes; determining, an execution time of the one or more ancestor nodes; and calculating an optimized timeout value of the selected node as a function of the maximum amount of time and the execution time, wherein the accessing the workflow, the determining the maximum amount of time, the determining the execution time, or the calculating is performed via one or more hardware processors.

Yet another aspect of the present disclosure involves a non-transitory machine-readable medium having stored thereon machine-readable instructions executable to cause a machine to perform operations comprising: accessing a workflow in a Service Oriented Architecture (SOA) environment, wherein the workflow comprises a plurality of nodes including a first node and a second node, wherein the first node is a parent node of the second node; configuring a timeout value of the first node and a timeout value of the second node; executing the first node; determining an execution time of the first node; calculating an amount of time saved associated with the execution of the first node by subtracting the execution time from the configured timeout value of the first node; and determining an optimized timeout value of the second node as a function of the amount of time saved and the configured timeout value of the second node.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
accessing a workflow in a Service Oriented Architecture (SOA) environment, wherein the workflow includes a plurality of nodes;
determining, for a selected node of the plurality of nodes, a maximum amount of time that is allotted to a portion of the workflow from a beginning of the workflow to a completed execution of the selected node, wherein the selected node has one or more ancestor nodes;
determining an execution time of the one or more ancestor nodes; and
calculating an optimized timeout value of the selected node as a function of the maximum amount of time and the execution time.

2. The method of claim 1, wherein:
the workflow comprises a plurality of nodes that comprise the selected node and the one or more ancestor nodes;
a first subset of the plurality of nodes comprise a plurality of compute nodes;
a second subset of the plurality of nodes comprise input/output (IO) nodes; and
the selected node and the one or more ancestor nodes are each separate instances of the IO nodes.

3. The method of claim 1, wherein an execution engine is configured to execute at least some nodes of the plurality of nodes in parallel.

4. The method of claim 1, wherein the workflow is defined using a Directed Acyclic Graph (DAG) that includes a unidirectional execution flow, wherein a workflow engine is configured to execute the one or more ancestor nodes before the selected node using the unidirectional execution flow.

5. The method of claim 1, further comprising:
repeating the accessing the workflow, the determining the maximum amount of time, the determining the execution time, and the calculating for one or more other nodes of the plurality of nodes.

6. The method of claim 1, wherein the determining the maximum amount of time comprises executing at least a portion of the workflow using a workflow engine, wherein during the executing the determining comprises retrieving, via an application hook, a timeout value of at least one of the one or more ancestor nodes.

7. The method of claim 1, further comprising:
reading a value of a flag associated with the selected node; and
applying a preconfigured timeout value to the selected node in response to the value of the flag indicating that the optimized timeout value should not be used for the selected node.

8. The method of claim 1, further comprising:
initiating execution of the workflow;
during execution of the workflow, executing the ancestor nodes; and
updating the optimized timeout value based on an actual execution time of at least one of the ancestor nodes.

9. A device, comprising:
a non-transitory memory storing instructions; and
a processor configured to execute the instructions to cause the device to:
access a workflow that includes a plurality of nodes, wherein the workflow is executable by a workflow engine, wherein at least some of the plurality of nodes indicate certain tasks that are executed during execution of the workflow;
determine, prior to execution of the workflow and for a selected node of the plurality of nodes, a maximum amount of time that is allotted to a portion of the workflow from a beginning of the workflow to a projected completed execution of the selected node, wherein the selected node has one or more ancestor nodes;
determine a projected execution time of the one or more ancestor nodes; and
calculate an optimized timeout value of the selected node as a function of the maximum amount of time and the execution time.

10. The device of claim 9, wherein:
the workflow comprises a plurality of nodes that comprise the selected node and the one or more ancestor nodes;
a first subset of the plurality of nodes comprise a plurality of compute nodes;
a second subset of the plurality of nodes comprise input/output (IO) nodes; and
the selected node and the one or more ancestor nodes are each separate instances of the IO nodes.

11. The device of claim 9, wherein an execution engine is configured to execute at least some nodes of the plurality of nodes in parallel.

12. The device of claim 9, wherein the workflow is defined using a Directed Acyclic Graph (DAG) that includes a unidirectional execution flow, wherein a workflow engine is configured to execute the one or more ancestor nodes before the selected node using the unidirectional execution flow.

13. The device of claim 9, wherein executing the instructions further causes the device to:
repeat the accessing the workflow, the determining the maximum amount of time, the determining the execution time, and the calculating for one or more other nodes of the plurality of nodes.

14. The device of claim 9, wherein the determining the maximum amount of time comprises executing at least a portion of the workflow using a workflow engine, wherein during the executing the determining comprises retrieving, via an application hook, a timeout value of at least one of the one or more ancestor nodes.

15. The device of claim 9, wherein executing the instructions further causes the device to:
initiate execution of the workflow;
during execution of the workflow, execute the ancestor nodes and update the optimized timeout value based on an actual execution time of at least one of the ancestor nodes.

16. A non-transitory machine-readable medium having instructions stored thereon, the instructions executable to cause performance of operations comprising:
accessing a workflow that includes a plurality of nodes, wherein the workflow is executable by a workflow engine, wherein each of the plurality of nodes indicates a respective task that is executed during execution of the workflow;
determining, prior to execution of the workflow and for a first node of the plurality of nodes, a maximum amount of time associated with a portion of the workflow from a certain position during execution of the workflow to an anticipated completion of execution of the first node, wherein the first node has one or more parent nodes as indicted by the workflow;

calculating an optimized timeout value of the first node based on the maximum amount of time and an anticipated execution time of the one or more parent nodes; and modifying execution parameters of at least the first node based on the optimized timeout value.

17. The non-transitory machine-readable medium of claim 16, wherein the operations further comprise:
modifying execution parameters of the workflow based on actual execution of some of the plurality of nodes during execution of the workflow.

18. The non-transitory machine-readable medium of claim 16, wherein an execution engine is configured to execute at least some nodes of the plurality of nodes in parallel.

19. The non-transitory machine-readable medium of claim 16, wherein the workflow is defined using a Directed Acyclic Graph (DAG) that includes a unidirectional execution flow, wherein a workflow engine is configured to execute the one or more parent nodes before the first node using the unidirectional execution flow.

20. The non-transitory machine-readable medium of claim 16, wherein the operations further comprise:
repeating the accessing the workflow, the determining the maximum amount of time, the determining the execution time, and the calculating for one or more other nodes of the plurality of nodes.

* * * * *